United States Patent [19]

Salzer et al.

[11] Patent Number: 4,798,002
[45] Date of Patent: Jan. 17, 1989

[54] WALL THICKNESS MEASURING METHOD AND APPARATUS

[75] Inventors: Leander J. Salzer; Donald A. Bergren, both of Los Alamos, N. Mex.

[73] Assignee: The United States of America as represented by the United States Department of Energy, Washington, D.C.

[21] Appl. No.: 105,154

[22] Filed: Oct. 6, 1987

[51] Int. Cl.[4] ................................................ A45B 3/08
[52] U.S. Cl. ................................... 33/125 A; 356/381
[58] Field of Search ............. 33/125 R, 125 A, 125 C, 33/529, 167; 356/381, 375, 240, 241

[56] References Cited

U.S. PATENT DOCUMENTS

| Re. 22,531 | 8/1944 | Hare | 33/125 R |
|---|---|---|---|
| 2,346,486 | 4/1944 | Hare | 33/125 R |
| 2,349,429 | 5/1944 | Herzog et al. | 33/125 R |
| 3,902,811 | 9/1975 | Altman et al. | 356/398 |
| 4,136,457 | 1/1979 | Langer | 33/167 |
| 4,220,966 | 9/1980 | Montone | 356/240 X |

FOREIGN PATENT DOCUMENTS 0023810  2/1982  Japan .................................. 356/381

Primary Examiner—L. T. Hix
Assistant Examiner—Brian W. Brown
Attorney, Agent, or Firm—Jack E. Ebel; Paul D. Gaetjens; Judson R. Hightower

[57] ABSTRACT

An apparatus for measuring the wall thickness of a nonmagnetic article having a housing supporting a magnet and a contiguous supporting surface. The tubular article and the housing are releasably secured to the supporting surface and a support member of an optical comparator, respectively. To determine the wall thickness of the article at a selected point, a magnetically responsive ball is positioned within the tubular article over said point and retained therein by means of a magnetic field produced by the magnet. Thereafter, an optical comparator is employed to project a magnified image of the ball on a screen and the wall thickness at the selected point is calculated by using a ball surface measurement taken with the comparator in conjunction with a previously determined base line measurement.

31 Claims, 5 Drawing Sheets

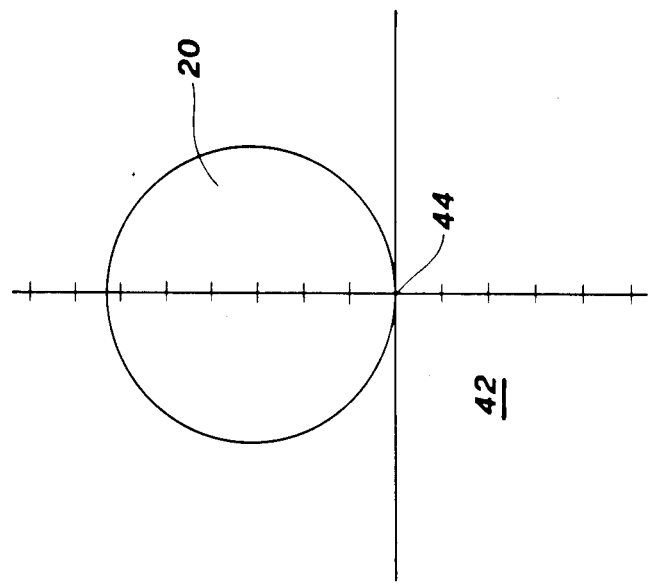

WALL THICKNESS MEASURING METHOD AND APPARATUS

This invention is the result of a contract with the Department of Energy (Contract No. W-7405-ENG-36).

BACKGROUND OF THE INVENTION

The present invention relates to a method and apparatus for measuring the wall thickness of an article and, more particularly, to an apparatus for and a method of measuring the wall thickness of an article having an aperture therethrough at a selected position along the length thereof.

Conventionally, the wall thickness of a given article, especially a tubular article, can be measured by a variety of means. For example, calipers and micrometers are commonly employed. Ultrasonic methods have also been employed. However, such means and methods are time-consuming, imprecise and often relatively complicated. In general, use of conventional measuring means and methods becomes increasingly difficult with increasing length and/or decreasing diameter of the tubular article to be measured.

In the manufacturing, machining, and inspection of components where close tolerances are essential to the assembly and/or the function thereof, relatively quick and extremely accurate determination of wall thickness is required for efficient and effective quality control. Accordingly, a need exists for an apparatus and for a method of determining wall thickness which are relatively fast and simple and result in repeatable, accurate readings.

One object of the invention is to provide for inexpensive, readily taken measurements of wall thickness at selected points on the walls of tubular articles.

Another object of the invention is to measure wall thickness in tubular articles having relatively long lengths and relatively small diameters.

It is a still further object of the present invention that measurements taken in accordance therewith are accurate and repeatable.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In one characterization of the present invention, apparatus for use in conjunction with an optical comparator to determine the wall thickness of a nonmagnetic article is provided which has a housing supporting a magnet and a support surface contiguous with said magnet. The article is releasably secured to the support surface and a ball is positioned within an aperture in said article and retained therein by means of a magnetic field produced by the magnet.

In another characterization of the present invention, apparatus for measuring a nonmagnetic article to determine the wall thickness thereof is provided having an optical comparator and a housing supporting a magnet with a support surface which is contiguous with the magnet. The optical comparator has a light source, a support member which can be vertically displaced, and a screen for displaying a magnified image of an article positioned on the support member and illuminated by the light source. The housing is releasably secured to the support member. The article is releasably secured to the support surface and a ball is positioned within an aperture in the article and retained therein by means of a magnetic field produced by the magnet.

In yet another characterization of the present invention a method for measuring a nonmagnetic, generally tubular article to determine wall thickness at a selected point in provided utilizing the apparatus of the present invention wherein the light source of an optical comparator is activated to project a magnified image of a supporting surface on the screen. The support member of the comparator is then vertically adjusted to align the support surface with a base line present on the screen. The tubular article is releasably secured to the supporting surface at the selected point where wall thickness is to be determined. A ball is positioned within the tubular article over the point and secured therein by means of a magnetic field produced by the magnet. The light source is again activated and the image of a surface of the ball is aligned with the screen base line by vertically adjusting the support member of the comparator. A measurement of the displacement of the support member of the comparator is obtained from a readout on the comparator and is utilized to calculate the wall thickness of the tubular article.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 4 and 5 depict typical images on the screen of an optical comparator for a ball utilized in accordance with the present invention.

DETAILED DESCRIPTION OF A PREFERRED EMBODIMENT

Figure 1:
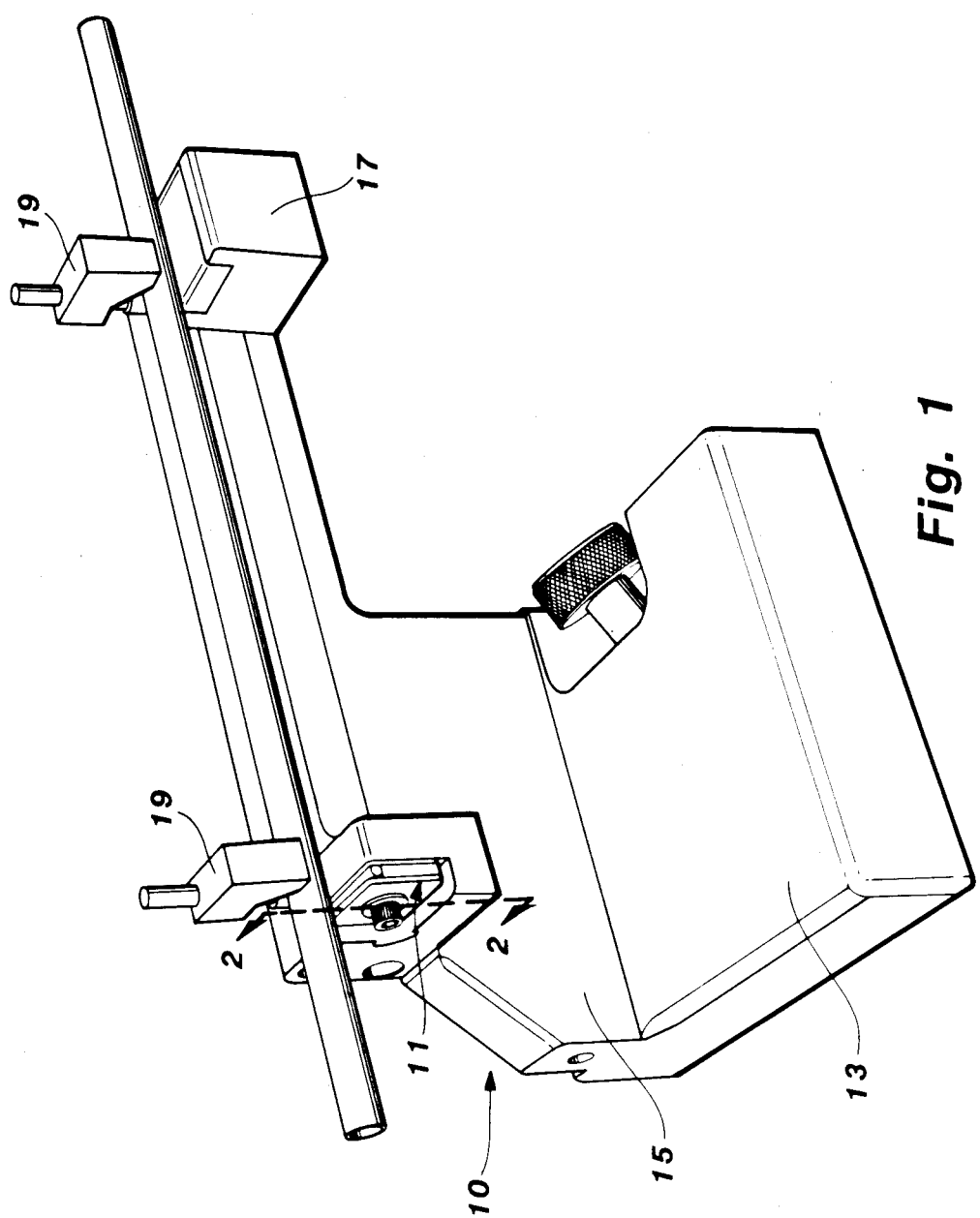
FIG. 1 is a perspective view of the wall thickness measuring apparatus of the present invention.

As illustrated in FIG. 1, the wall thickness measuring apparatus of the present invention, illustrated generally as 10, comprises a generally rectilinear configured base member 13 having an arm member 15 extending upwardly from one end thereof. A substantially U-shaped platform member 17 is secured to the upper end of arm member 15. Members 13, 15, and 17 can be integrally formed from any suitable nonmagnetic material. A pair of clamps 19 are secured to the upper surface of U-shaped member 17 by any suitable means. A magnet support member 11 is secured to the outside of one leg of U-shaped member 17 by, for example, a conventional nut and bolt assembly. Apparatus 10 is releasably secured to the supporting surface of an optical comparator by any suitable means, for example, by a clamp (not illustrated).

Figure 2:
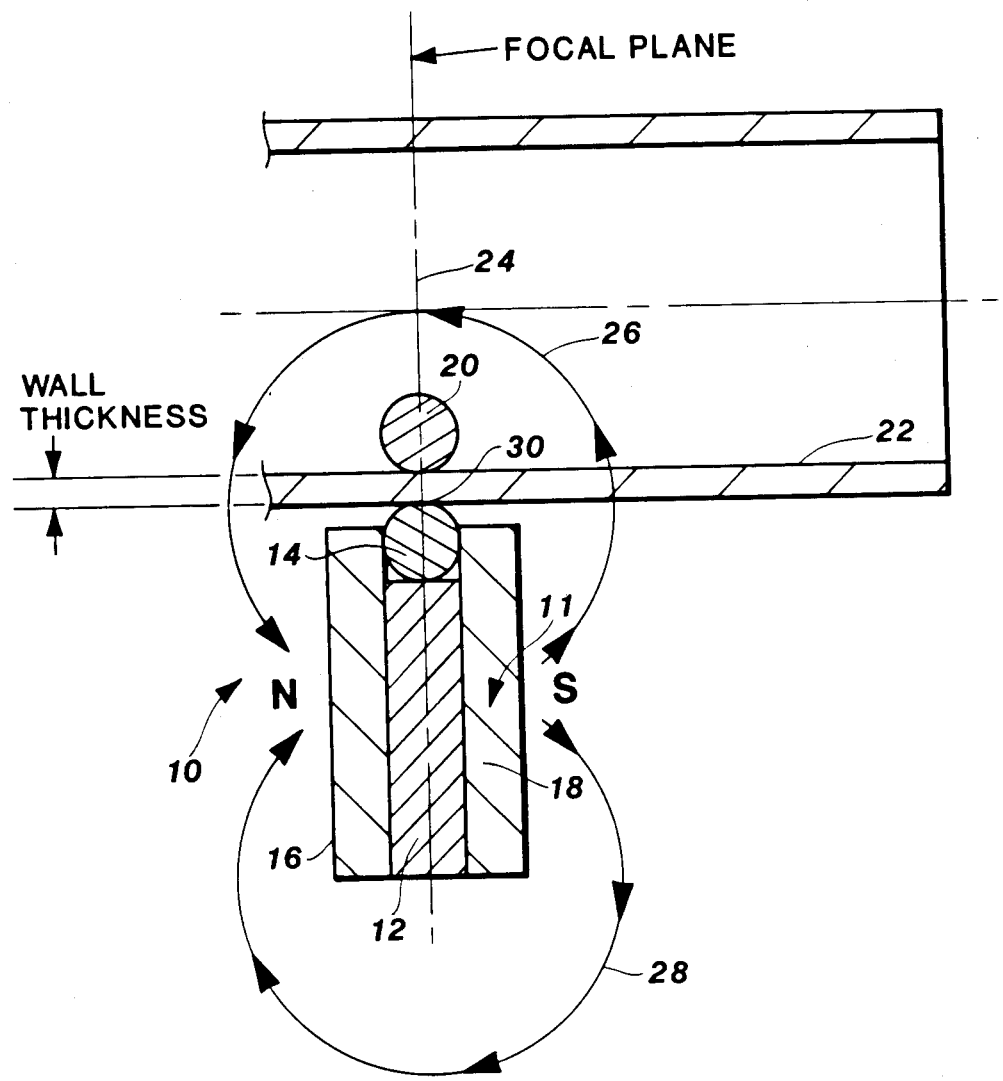
FIG. 2 is a cross-sectional view of the preferred embodiment of the apparatus of the present invention taken along line 2—2 of FIG. 1.

Reference is now made to FIG. 2 which illustrates a preferred embodiment of the apparatus 10 of the present invention. Magnetic support member 11 is comprised of magnet 12, a nonmagnetic, generally cylindrical support member 14, clamps 16 and 18, and ball 20 of selected diameter. Clamps 16 and 18 are relatively thin and have a generally rectangular peripheral configuration. Clamps 16 and 18 secure magnet 16 and cylindrical member 14 in a contiguous relationship within a focal plane 24 of an optical comparator 32, as illustrated in FIG. 3.

Magnet 12 has poles N and S and produces a magnetic field schematically represented by circular arrows 26 and 28. Ball 20 is positioned within tubular article 22. Tubular article 22 is releasably secured to magnetic support member 11 by any suitable means, such as, clamps 19 (FIG. 1). As utilized throughout this specification, the term "tubular" includes not only hollow cylinders but also hollow structures having polygonal cross sectional configurations. Cylindrical member 14 is preferably constructed of molybdenum. The outer periphery of cylindrical member 14 is provided with a support surface 30 for the tubular article 22. Support surface 30 is positioned at a known position within focal plane 24 and extends a small distance beyond the periphery of both clamps 19. Ball 20 is attracted and held within focal plane 24 by the field produced by magnet 12.

In the preferred embodiment, ball 20 is a generally spherical ball constructed of a magnetic material, such as steel, to render ball 20 responsive to magnet 12 in the manner described herein. Magnet 12 may be a permanent magnet, as in the preferred embodiment, or an electromagnet. Although illustrated as circular in cross section, support member 14 can be provided with a knife edge or a thin flat surface which functions as a support surface. Those skilled in the art will recognize alternative support surface configurations suitable to support articles to be measured in accordance with the practice of the present invention.

Figure 3:
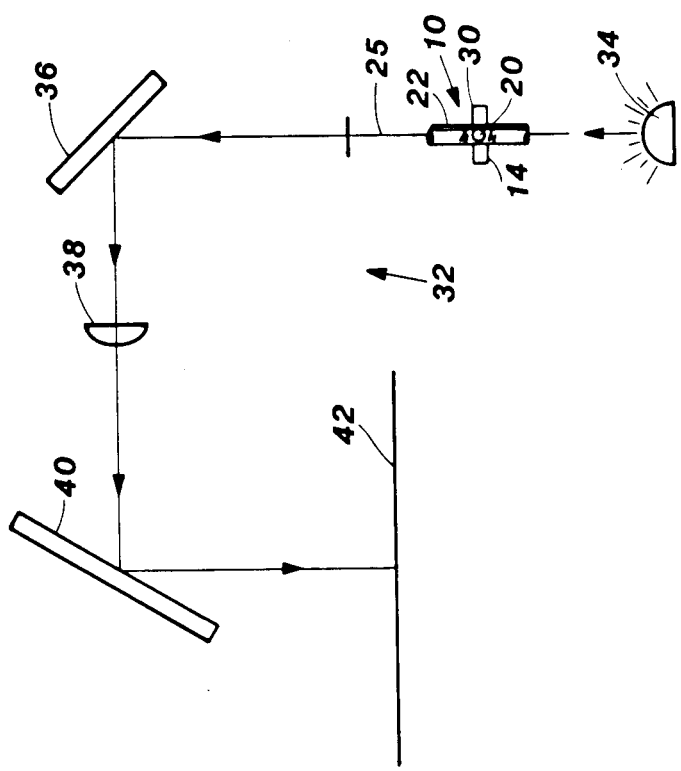
FIG. 3 is a schematic illustration of the apparatus of the present invention in use with an optical comparator.

FIG. 3 illustrates the measuring apparatus used in cooperation with an optical comparator 32, which may be, for example, an DQ-30S side screen contour projector manufactured by Optical Gaging Products, Inc. Ball 20 is illustrated as positioned within tubular article 22. Ball 20 and surface 30 of member 14 are aligned within the optical path 25 of comparator 32. The optical comparator is comprised of light source 34, first mirror 36, magnification lens 38, second mirror 40, and imaging screen 42. Screen 42 is provided with an appropriate scale to measure the dimensions of images projected thereon. Upon alignment of the longitudinal axis of tubular article 22 with light source 34, light is projected through article 22 to produce a magnified image of ball 20 on screen 42 in accordance with the operation of the optical comparator. Apparatus 10 is releasably secured to a supporting surface of comparator 32 upon which articles to be imaged on screen 42 are positioned. A motor (not illustrated) may be connected to the support surface to displace it in a horizontal or a vertical direction. The comparator 32 is provided with digital readouts to display such displacement in increments of, for example, 0.0001 in.

To measure or confirm the wall thickness of tubular article 22, light source 34 is activated to project an image of generally cylindrical member 14 on screen 42. The supporting surface of the optical comparator is vertically adjusted to align the image of support surface 30 with the zero or base indicia of the scale appearing on screen 42. The digital displacement readout of the comparator can be either zeroed or the existing readout can be utilized as a base measurement. Thereafter, tubular article 22 is secured to apparatus 10 by clamps 19 so that the point along article 22 where a wall thickness measurement is desired is positioned on surface 30. Ball 20 is then positioned within tubular article 22. Preferably, ball 20 has a diameter about 30% or less of the inside diameter of tubular article 22 to be measured to ensure optimum accuracy in measuring wall thickness in accordance with the present invention. In addition, the desired precision of the measurement to be determined by a top of ball 20 reading in accordance with the practice of the present invention as hereinafter described will dictate the acceptable tolerance of spherical ball 20. For example, ball dimensions within a tolerance of 0.0001 in. will not introduce more than 0.0001 in. error to top of ball measurements taken in accordance with the present invention. The magnetic field produced by magnet 12 is effective to center and retain ball 20 in position over the point at which wall thickness is to be measured.

Figure 4:
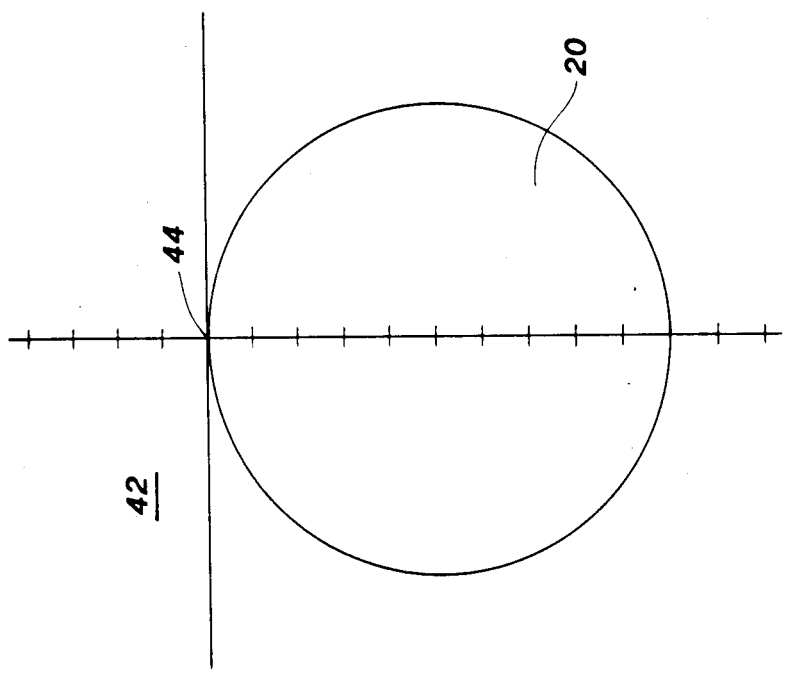

The optical comparator is then used to determine the position of the top or the bottom of the ball, as applicable, by projecting light through article 22 to produce a magnified image of ball 20 on screen 42. The support surface of comparator 32 is then vertically displaced to position a surface of ball 20 on the zero or base indicia of the scale appearing on screen 42. As illustrated in FIG. 4, if the top of ball 20 is positioned at the zero or base indicia 44 on screen 42, the known diameter of ball 20 is subtracted from the digital displacement readout on comparator 32, to determine the thickness of the wall at the selected point. As illustrated in FIG. 5, if the position of the bottom of ball 20 is positioned at the zero or base indicia 44 or screen 42, the digital displacement readout is the thickness of the article wall at the selected point. FIGS. 4 and 5 illustrate the image of ball 20 on the screen of comparator 32 for typical top and bottom of ball readings, respectively.

By rotating and sliding tubular article 22 on surface 30, a series of readings at various points along the wall thereof can be easily and quickly taken since surface 30 has previously been established as the base measurement. Utilizing the apparatus of the present invention, wall thickness measurements have been made to accuracies on the order of 0.0002 in. Wall thickness of nonmagnetic articles other than tubing can be measured as long as a suitable optical path length is available for the optical comparator.

The invention has been described in detail with particular reference to a preferred embodiment thereof, but it will be understood that variations and modifications can be effected within the scope of the invention.

Even though the apparatus and method of the present invention have been described in conjunction with measuring the wall thickness of tubular articles, the apparatus and method of the present invention are not limited in application to tubular articles but are equally applicable to measuring wall thickness of articles having an aperture therein and to articles having trough or channel cross-sectional configurations or other configurations, the wall thickness of which are difficult to measure by application of conventional means and methods.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for use in conjunction with an optical comparator to measure a nonmagnetic article having an aperture therein so as to determine the wall thickness of the article, the optical comparator having a support member which can be vertically displaced, the apparatus comprising:
   support means for supporting said article:
   a ball of known diameter for positioning within said aperture; and
   a magnet contiguous with said support means and producing a magnetic field sufficient to retain said ball positioned within said aperture directly above said support means.

2. The apparatus of claim 1 further comprising:
   securing means for releasably securing said article to said support means.

3. The apparatus of claim 2 further comprising:
   housing means for supporting said support means, said magnet, and said securing means in a fixed relationship relative to each other, said housing means being releasably secured to said support member.

4. The apparatus of claim 2 wherein said article is generally tubular.

5. The apparatus of claim 4 wherein said support means comprises a nonmagnetic, generally cylindrical member having a peripheral surface for supporting said tubular article.

6. The apparatus of claim 5 further comprising:
   magnet securing means for releasably securing said magnet to said cylindrical member.

7. The apparatus of claim 6 wherein said magnet securing means comprises a pair of relatively thin clamps having generally rectilinear peripheral configurations, wherein said magnet and said cylindrical member are positioned between the clamps so that said support surface of said cylindrical member extends beyond the periphery of both of said clamps.

8. The apparatus of claim 4 wherein said securing means comprises a pair of clamps.

9. The apparatus of claim 3 wherein said housing means comprises a generally rectilinear configured base member, a substantially U-shaped platform member, and an arm member having one end integral with said base member and another end integral with said platform member.

10. The apparatus of claim 9 further comprising:
    magnet securing means for releasably securing said magnet to one leg of said substantially U-shaped platform member.

11. The apparatus of claim 10 wherein said magnet securing means comprises a pair of relatively thin clamps having a generally rectilinear peripheral configuration, wherein said magnet and said cylindrical member are positioned between the clamps so that said generally planar surface extends beyond the periphery of both of said clamps.

12. The apparatus of claim 9 wherein said securing means comprises a pair of clamps attached to said substantially U-shaped platform member.

13. An apparatus for measuring a nonmagnetic article having an aperture therein to determine the wall thickness of the article comprising:
    support means for supporting said article;
    a ball of known diameter for positioning within said aperture;
    a magnet contiguous with said support means and producing a magnetic field sufficient to retain said ball positioned within said aperture directly above said support means; and
    an optical comparator having a light source, a support member for said support means and said magnet, a display screen, means for projecting a magnified image of said article onto said screen, and means for vertically displacing said support member.

14. The apparatus of claim 13 further comprising:
    securing means for releasably securing said article to said support means.

15. The apparatus of claim 14 further comprising:
    housing means for supporting said support means, said magnet, and said securing means in a fixed relationship relative to each other, said housing means being releasably secured to said support member.

16. The apparatus of claim 14 wherein said article is generally tubular.

17. The apparatus of claim 16 wherein said support means comprises a nonmagnetic generally cylindrical member having a peripheral surface for supporting said tubular article.

18. The apparatus of claim 17 further comprising:
    magnet securing means for releasably securing said magnet to said cylindrical member.

19. The apparatus of claim 18 wherein said magnet securing means comprises a pair of relatively thin clamps having generally rectilinear peripheral configurations, wherein said magnet and said cylindrical member are positioned between the clamps so that said support surface of said cylindrical member extends beyond the periphery of both of said clamps.

20. The apparatus of claim 16 wherein said securing means comprises a pair of clamps.

21. The apparatus of claim 15 wherein said housing means comprises a generally rectilinear configured base member, a substantially U-shaped platform member, and an arm member having one end integral with said base member and another end integral with said platform member.

22. The apparatus of claim 21 further comprising:
    magnet securing means for releasably securing said magnet to one leg of said substantially U-shaped platform member.

23. The apparatus of claim 22 wherein said magnet securing means comprises a pair of relatively thin clamps having a generally rectilinear peripheral configuration, wherein said magnet and said cylindrical member are positioned between the clamps so that said generally planar surface extends beyond the periphery of both of said clamps.

24. The apparatus of claim 21 wherein said securing means comprises a pair of clamps attached to said substantially U-shaped platform member.

25. The apparatus of claim 13 further comprising:

readout means for determining the displacement of said support member.

26. A method for measuring the wall thickness of a nonmagnetic, generally tubular article, comprising the steps of:
    (a) positioning a ball of known diameter and of magnetic material within said tubular article:
    (b) positioning said tubular article on a support surface which contacts said article at a location to be measured;
    (c) establishing a magnetic field effective to retain said ball within said article above said support surface; and
    (d) optically determining said wall thickness from said known diameter and relative position of said ball from said support surface.

27. A method for measuring a nonmagnetic, generally tubular article to determine the wall thickness of the article at a selected point, wherein an optical comparator having a light source, a support member for the article, a screen displaying a magnified image of the article, and a readout to indicate vertical displacement of the support member is utilized in conjunction with a magnet and a supporting surface which is contiguous with and secured to the magnet, said supporting surface and said magnet being releasably secured to said support member, the method comprising:
    (a) determining a relative position readout for said support surface;
    (b) positioning said selected point above said supporting surface;
    (c) positioning a magnetically responsive ball of known diameter within said tubular article, said magnet retaining said ball directly above said supporting surface;
    (d) determining a relative position readout for a surface of said ball; and
    (e) determining the thickness of said tubular article at said selected point from the relative position readouts for said supporting surface and said ball surface.

28. A method for measuring a nonmagnetic, generally tubular article to determine the wall thickness of the article at a selected point, wherein an optical comparator having a light source, a support member for the article, a screen for displaying a magnified image of the article, and a readout to indicate vertical displacement of the support member is utilized in conjunction with a magnet and a supporting surface which is contiguous with and secured to the magnet, said supporting surface and said magnet being releasably secured to said support member, the method comprising:
    (a) activating said light source to project a magnified image of said supporting surface on said screen;
    (b) vertically adjusting said support member to align the image of said supporting surface with base indicia of a scale present on said screen;
    (c) releasably securing said article to said supporting surface so that said point is positioned on said supporting surface;
    (d) positioning a magnetically responsive ball within said tubular article over said point so that a magnetic field produced by said magnet retains said ball in position over said point;
    (e) activating said light source to project a magnetic image of said ball on said screen;
    (f) vertically adjusting said support surface to align the image of the surface of said ball with said base indicia; and
    (g) calculating the wall thickness at said point from a displacement value display on said readout.

29. The method of claim 28 wherein said surface of said image is the top surface of said ball and the wall thickness is calculated by subtracting the diameter of said ball from said displacement value.

30. The method of claim 28 wherein said surface of said image is the bottom surface of said ball and the wall thickness is said displacement value.

31. The method of claim 28 further comprising:
    (a) releasing said article from said supporting surface;
    (b) releasably securing said article to said supporting surface so that a second selected point is positioned on said supporting surface; and
    (c) repeating steps (d) through (g) with respect to said second selected point to determine the wall thickness at said second selected point.

* * * * *